United States Patent [19]

Pinckard

[11] Patent Number: 5,395,535
[45] Date of Patent: Mar. 7, 1995

[54] REMOVAL OF HAZARDOUS CHEMICAL SUBSTANCES FLOATING ON WATER

[76] Inventor: Joseph A. Pinckard, 150 Pleasant Creek Rd., Rogue River, Oreg. 97537

[21] Appl. No.: 304,497

[22] Filed: Sep. 12, 1994

[51] Int. Cl.$^6$ ............................................... C02F 1/28
[52] U.S. Cl. .................................. 210/691; 210/922; 210/924; 210/690
[58] Field of Search ............... 210/691, 692, 693, 924, 210/690, 922, 242.4, 694

[56] References Cited

U.S. PATENT DOCUMENTS

| | | | |
|---|---|---|---|
| 3,562,153 | 2/1971 | Tully et al. | 210/693 |
| 3,591,524 | 7/1971 | Eriksen | 210/924 |
| 3,617,565 | 11/1971 | Fahlvik | 210/500 |
| 3,703,464 | 11/1972 | Ferm | 210/691 |
| 3,769,164 | 10/1973 | Azarowicz | 210/611 |
| 3,771,653 | 0/1973 | Harnett | 210/40 |
| 3,779,866 | 12/1973 | Azarowicz | 210/606 |
| 3,791,990 | 0/1974 | Fischer et al. | 252/427 |
| 3,871,956 | 3/1975 | Azarowicz | 210/611 |
| 3,902,998 | 9/1975 | Bertram | 210/40 |
| 4,070,287 | 1/1978 | Wiegand et al. | 210/505 |
| 4,102,783 | 7/1978 | Zenno et al. | 210/36 |
| 4,832,852 | 5/1989 | Wells et al. | 210/671 |
| 4,925,343 | 5/1990 | Raible et al. | 405/60 |
| 5,009,790 | 4/1991 | Bustamante et al. | 210/689 |
| 5,100,455 | 3/1992 | Pinckard | 71/9 |
| 5,114,593 | 5/1992 | Diaz | 210/691 |
| 5,160,629 | 11/1992 | Brown | 210/924 |

OTHER PUBLICATIONS

Jean Hays, A new breed of cat in the oil-spill cleanup game, p. 9, Aug. 15, 1994, The Wichita Eagle, (Kansas).
Cotton Ginners Handbook, Agricultural Handbook No. 503, Agri. Res. Ser. U.S.D.A., 1977, 110 pages, pp. 80–81.
ZoBell, C., Assimilation of hydrocarbons by microorganisms, Scripps Institute, New Series No. 438, pp. 479–481, 1950.

*Primary Examiner*—Cynthia L. Nessler
*Attorney, Agent, or Firm*—William S. Ramsey

[57] ABSTRACT

A product and a process is disclosed for the purpose of biodegrading organic chemical spills on water or land in situ. The product is a dried, macerated plant or vegetable material having a small oil or wax content enabling it to preferentially absorb oil in the presence of water. The product, specifically cotton gin trash, carries a microbial inoculum consisting of indigenous microbes which biodegrade the organic chemical, specifically petroleum hydrocarbons. The process consists of applying the macerated cotton gin trash to the surface of the hydrocarbons floating on water or covering the land. Upon contact of the product with water a dormant inocula of microorganisms are revived. They increase in numbers because of food present in the product, biodegrading the chemical spill in situ.

4 Claims, No Drawings

REMOVAL OF HAZARDOUS CHEMICAL SUBSTANCES FLOATING ON WATER

FIELD OF THE INVENTION

The present invention relates to the cleansing of the surfaces of water on which hazardous chemical substances, in liquid or emulsible form, may be floating.

BACKGROUND OF THE INVENTION

The most common examples of spills cleansed by this invention are petroleum hydrocarbons spilled on bodies of water in harbors, lakes, rivers and oceans. This patent discloses a product and process for disposal of toxic liquids and/or suspensions that may be absorbed on an organic substrate and disposed of in situ, specifically a waste agricultural product that has been processed for the above purpose. Cotton gin trash (also called cotton gin waste) is the residue remaining from the mechanical separation of cottonseed from its lint by a cotton gin. (Cotton Ginners Handbook, Agricultural Handbook No. 503, Agri. Res. Ser. U.S.D.A. 1977, pages 80–81). In the United States cotton is harvested by mechanical pickers and considerable plant debris of many kinds is also collected along with the cottonseed. After the seed and mass of plant debris has passed through a cotton gin to remove the seed and lint the trash is dried to 5–20% by weight moisture. It absorbs oily liquids such as petroleum hydrocarbons and grease on water surfaces and may be disposed of by leaving the unwanted substance soaked in gin trash to biedegrade in the water. The microflora contained in the gin trash biodegrades the unwanted substance, in situ, to harmless residues. The process is known as mineralization.

Accidental spills of petroleum hydrocarbons and similar hazardous liquids frequently occur on bodies of water. A thin film is usually first formed; difficult to remove by any means. In working with cotton gin trash for cleansing spills of hazardous liquids on streets and occupied areas I found the dry trash was difficult to wet with water without a surfactant but that it readily absorbed oily materials. That the natural oils and waxes contained in the gin trash or debris repelled the absorption of water enabling the mass to float while the plant debris soaked up the oil film effectively and preferentially removing most, if not all, of the surface film from the water. The plant debris, with its oil content may be biodegraded in situ and need not be removed from the water for further disposal.

When cotton is harvested in the United States a mechanical cotton picker traverses the field gathering the seed by beth mechanical and vacuum equipment. The vacuum process automatically collects a small amount of soil, even small stones. Lint cleaners at the gin remove most of the soil disposing of it in the trash. If a small sample of the dry gin trash (12 to 15% moisture content) be placed in water and the water examined microscopically every few hours one will find active microorganisms cruising about after 16 to 18 hours even though the gin trash has been in dry storage for over three years. Within 24 to 48 hours a very large population of microorganisms will be active in the water. These microorganisms came from cotton field soil and feed on the 16 percent protein, along with the many carbohydrates present in the cotton gin trash plant debris. This vast population of indigenous soil inhabiting microorganisms in the presence of water and petroleum hydrocarbons, benzene, toluene and xylenes, for example, has been used to biodegrade more than 20 hazardous substances, repeatedly. See U.S. Pat. No. 5,100,455, incorporated by reference.

A review of the technical literature discloses that as early as 1950 indigenous soil and sea water inhabiting microorganisms were observed biodegrading petroleum hydrocarbons. Many of the oil degrading organisms were specifically identified (ZoBell C., Assimilation of hydrocarbons by microorganisms. Scripps Institution of Oceanography, Univ. Calif., New Series No. 438, pages 479–481. 1950). The early reports by ZoBell reveal that petroleum hydrocarbons provide excellent sources of food and energy for a large number of soil inhabiting microorganisms capable of mineralizing oils and grease within a few days if water and mineral salts are available at favorable temperatures. Because cotton gin trash, itself, contains an oil and wax enabling it to repel absorption of water, and absorb oil while floating, and because the gin trash also carries a large number of the soil's indigenous microorganisms that utilize oils as a source of food and energy an ideal environment is provided for processed cotton gin trash to cleanse water surfaces of oil spills.

A review of the U.S. Patent literature discloses the following information:

U.S. Pat. No. 3,771,653, issued to J.P. Harnett, Nov. 13, 1973, discloses the use of a compost prepared by the bacterial digestion of organic waste material. I have tried Harnett's method of adding composted organic waste to an oil film floating on water. Some of the compost sinks without absorbing much oil. Furthermore, no mention is made of cotton gin trash in this patent although cotton gin trash is composed of about half organic waste and half mineral soil.

U.S. Pat. No. 3,791,990, issued to K. O. P. Fischer, Feb. 12, 1974, makes no mention of cotton gin trash although Fischer discusses removal of oil from water.

U.S. Pat. No. 3,902,998, issued to L. E. Bertram, Sep. 2, 1975, discloses the use of rice hulls to remove oil from water surfaces but makes no mention of cotton gin trash for the above purpose.

U.S. Pat. No. 4,102,783, issued to A. Zenno, et al., Jul. 25, 1978. This patent discloses the use of "unrefined cotton lints" and "unrefined cotton linters" for absorbing oils from both fresh and sea water. This patent does not mention the use of cotton gin trash although it mentions "using the waste cotton formed in a cotton spinning step" (Page 4, lines 52 and 53). Such waste cotton is different from cotton gin trash which contains about 45 percent inorganic soil particles along with other plant debris. Cotton gin trash contains no cotton lints or cotton linters except by accident. Both cotton lints and linters are made from reginned cottonseed. Again, no mention is made by Zenno, et al., of the use of cotton gin trash for absorbing oils from water. His mention of "lints" and "linters" refers to short fibers obtained from the spinning of cotton by mills producing fabric.

U.S. Pat. No. 4,832,852, issued to G. G. Wells, et al., May 23, 1989, discloses the fabrication of a mat of cotton waste fibers to absorb oil on water surfaces. The waste fibers were those obtained by reginning cottonseed as referred to by Zenno, et al., as "unrefined lints and linters." Again, no mention is made of cotton gin trash.

U.S. Pat. No. 4,925,343, issuedto R. L. Raible, et al., May 15, 1990, discloses a mixture of wood fibers and cotton linters to absorb oil from land or water. The linters were obtained from the reginning of cottonseed as mentioneed by Wells, et al., and Zenno, et al. No mention is made of the use of cotton gin trash.

U.S. Pat. No. 5,009,790, issued to M. R. Bustamante, et al., Apr. 23, 1991, discloses the use of kelp residue for cleansing water of oils. As in the above patents no mention is made of cotton gin trash and neither does this have any bearing on my patent.

In none of the above patents is cotton gin trash mentioned. Perhaps I should emphasize, again, that cotton gin trash is the residue remaining from the factory separation of cottonseed from its lint by a cotton gin and that cotton lints and linters are very short fibers removed from seed by reginning. Because the mechanical cotton picker is not selective it gathers everything within its reach, including some soil, sending it all to a gin. The gin separates the lint from the seed, cleansing both of soil and plant debris which the gin sends to a trash pile. The trash may not be incinerated because of the clean air act. It may not be fed to livestock because of poisonous chemicals used as harvest aids. It may not be returned to the land because of noxious grass and weed seeds and because much of the trash may carry harmful insects. My method of processing cotton gin trash, disclosed herein, destroys the above unwanted insects, weed and grass seeds and thereby converts a useless hazardous waste to a valuable commodity.

DETAILED DESCRIPTION OF THE INVENTION

Certain plant and vegetable materials contain small amounts of oils, fats and waxes and if shredded or macerated the small pieces will float on liquids and suspensions supporting oil and oil-like substances. Where oils, greases and similar substances are floating on a surface such as oil on water the hydrophobic particle absorbs considerable oil; also some water. If the hydrophobic particles be made from cotton gin trash the particles also carry a supply of soil inhabiting microorganisms. (See Pinckard, J. A., U.S. Pat. No. 5,100,455, issued Mar. 31, 1992). Many of the microorganisms present in the particles of gin trash use the proteins, carbohydrates, and oil, or other biodegradeable toxicants as sources of food and energy which results in the mineralization of the toxicant to carbon dioxide, water and parent mineral material. The application of the above principles provides a practical means for cleansing water of oil spills regardless of whether the water be fresh or salt water.

The following esperiments were completed: Cotton gin trash was tub ground to a particle size ranging from a fine dust to more than an inch in length; ⅛ to one inch being preferable. Four grams of tub ground dry cotton gin trash were placed on oil in a quart Mason jar with 500 ml of tap water. Five grams of several different kinds of oils were floated on the water. The jars with their gin trash, oil and water were set on the laboratory shelf at room temperature (60° to 80° F.) to incubate. At various time intervals samples of the water in the jars were analyzed by an independent commercial chemist for an estimate of total petroleum hydrocarbons (TPH) remaining. The results are shown in Table 1.

EXAMPLE No. 1: Diesel fuel from a farm tractor was placed on 500 ml of water in a jar to which 4 grams of tub ground cotton gin trash was added. Within 30 days most of the diesel fuel was biodegraded. See Table 1.

EXAMPLE No. 2: Five grams of sweet crude oil from a field near Lovington, N. Mex., was placed on 500 ml of water in a jar to which 4 grams of gin trash had been added. Within 45 days most of the sweet crude oil was biodegraded. See Table 1.

EXAMPLE No. 3: Five grams of heavy crude oil from a field near Laurel, Miss., was first thinned with benzene at a ratio of 1 to 1 by weight. Five grams of the mix 1 to 1 was placed on 500 ml of water in a jar. Four grams of tub ground cotton gin trash was then placed on the water. Within 60 days most of the heavy crude was biodegraded. See Table 1.

EXAMPLE No. 4: Five grams of heavy white refined mineral oil (pharmaceutical grade) was placed on 500 ml of water on which 4 grams of tub ground cotton gin trash was floated, then incubated at room temperature for several weeks. Within 50 days most of the mineral oil had been biodegraded.

An untreated check of the heavy Mississippi crude, dissolved in benzene (Example 3), and receiving no gin trash was included in the above set of four examples. After 60 days there was a loss of TPH caused, presumably, by the evaporation of benzene. See Table 1.

TABLE 1

Biodegradation of diesel fuel, sweet crude oil, heavy crude oil and refined mineral oil, in water, by the microflora of an agricultural crop waste, cotton gin trash.

| Toxic Substance Used | Initial Concentration ppm[1] | Approximate Remaining Concentrations After Stated Time Intervals in situ Weeks | | |
|---|---|---|---|---|
| | | 4 ppm | 8 ppm | 16 ppm |
| Diesel fuel | 10,000 | >200 | >100 | ND[2] |
| Sweet crude oil | 10,000 | >500 | >200 | ND |
| Heavy crude oil | 10,000 | >500 | >300 | ND |
| Refined mineral oil | 10,000 | >200 | >100 | ND |
| Check of heavy crude oil; no cotton gin trash | 10,000 | 8,420 | 7,800 | 7,650 |

[1] = Parts per million
[2] = Non detectable

The above disclosure enables one to cleanse surface waters in situ. Each small particle of plant or vegetable material that contains a bit of wax or oil tends to absorb oil in the presence of water, preferentially. Because the plant and vegetable particles of this disclosure carries an inoculum of indigenous soil microbes that return to activity from the dry state within 18 to 24 hours after contact with water they begin to biodegrade the absorbed oil no matter if it sinks to the bottom, or where it may drift. Because the plant or vegetable particles of this disclosure, cotton gin trash, also contains about 16 percent protein and a lesser amount of carbohydrate (sugars) the carbohydrates are soon depleted and the microflora must turn to the oil for a source of energy, consuming it in a few weeks.

Furthermore, heavy crude oils spilled in the ocean may be buffeted by wave motion causing the formation of tar balls which sink to the bottom and are difficult to dispose of. This invention discloses that if in the formation of tar balls they become mixed with processed cotton gin trash the anaeroboic microorganisms contained in the gin trash will biodegrade the tar balls in due course no matter where they may drift. The early work of Zobell

I claim:

1. A process for cleansing bodies of water containing spilled organic chemicals comprising the step:

1) absorbing the spilled chemicals with cotton gin trash.

2. The process of claim 1 further comprising the step before step 1):
   grinding cotton gin trash to a particle size approximating that of dust to an inch or more in length.

3. The process of claim 1 further comprising the step after step 1):
   allowing the absorbed chemicals and cotton gin trash to stand until the chemicals are substantially degraded.

4. The process of claim 1 further comprising the step before step 1:
   drying the cotton gin trash until it contains 5 to 20% by weight moisture.

* * * * *